US010256929B2

(12) United States Patent
Zhuang et al.

(10) Patent No.: US 10,256,929 B2
(45) Date of Patent: Apr. 9, 2019

(54) METHOD AND APPARATUS FOR DECISION DIRECTED COMMON PHASE ERROR ESTIMATION BASED ON SOFT INFORMATION

(71) Applicant: Samsung Electronics Co., Ltd., Gyeonggi-do (KR)

(72) Inventors: Binnan Zhuang, San Diego, CA (US); Hongbing Cheng, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 77 days.

(21) Appl. No.: 15/455,979

(22) Filed: Mar. 10, 2017

(65) Prior Publication Data

US 2018/0192310 A1    Jul. 5, 2018

Related U.S. Application Data

(60) Provisional application No. 62/442,047, filed on Jan. 4, 2017.

(51) Int. Cl.
 *H04B 17/309*    (2015.01)
 *H04L 27/26*    (2006.01)
 (Continued)

(52) U.S. Cl.
 CPC ......... *H04B 17/345* (2015.01); *H04B 7/0626* (2013.01); *H04B 17/309* (2015.01);
 (Continued)

(58) Field of Classification Search
 None
 See application file for complete search history.

(56) References Cited

U.S. PATENT DOCUMENTS 7,577,206 B2    8/2009  Kim
7,583,758 B2    9/2009  Gaikwad et al.
(Continued)

FOREIGN PATENT DOCUMENTS

CN   102123126    7/2011
EP   1933516      6/2008
EP   2164216      3/2010

OTHER PUBLICATIONS

Suyama, Satoshi et al., 60 GHz OFDM Experimental System Employing Decision-Directed Phase Noise Compensation, Copyright 2012 IEEE, pp. 191-194.
(Continued)

*Primary Examiner* — Ajit Patel
(74) *Attorney, Agent, or Firm* — The Farrell Law Firm, P.C.

(57) ABSTRACT

A method and apparatus are provided. The method includes receiving, by at least one antenna of a receiver, at least one signal from a transceiver, detecting at least one data symbol within the at least one signal, determining a probability associated with the at least one detected data symbol, determining channel state information (CSI) of at least one channel between the transceiver and the at least one antenna of the receiver, and estimating a common phase error (CPE) of the at least one signal based on the probabilities associated with the at least one detected data symbol and the CSI of the at least one channel.

20 Claims, 7 Drawing Sheets

(51) Int. Cl.
  *H04L 25/06* (2006.01)
  *H04B 17/345* (2015.01)
  *H04B 7/06* (2006.01)

(52) U.S. Cl.
  CPC ........ *H04L 25/067* (2013.01); *H04L 27/2657* (2013.01); *H04L 27/2679* (2013.01); *H04L 27/2675* (2013.01)

(56) References Cited

U.S. PATENT DOCUMENTS

| | | | |
|---|---|---|---|
| 7,733,993 B2 | 6/2010 | Lindh | |
| 7,773,690 B2 | 8/2010 | Hoo et al. | |
| 7,792,219 B2 | 9/2010 | Lee et al. | |
| 7,822,069 B2* | 10/2010 | Medvedev | H04L 1/0045 370/338 |
| 8,457,252 B2 | 6/2013 | Liu | |
| 8,488,442 B1 | 7/2013 | Narasimhan | |
| 8,693,561 B2 | 4/2014 | Raju et al. | |
| 9,191,183 B2 | 11/2015 | Ling et al. | |
| 2004/0156349 A1* | 8/2004 | Borisovich | H03L 7/07 370/343 |
| 2008/0273585 A1* | 11/2008 | Kim | H04L 27/0014 375/226 |
| 2010/0272169 A1 | 10/2010 | Holfeld et al. | |
| 2011/0176592 A1* | 7/2011 | Poitau | H04L 25/0212 375/224 |
| 2013/0114661 A1* | 5/2013 | Chiang | H04L 25/0202 375/229 |
| 2014/0270015 A1* | 9/2014 | Kravtsov | H04L 25/03821 375/343 |
| 2015/0095743 A1* | 4/2015 | Sato | H03M 13/353 714/774 |
| 2015/0110232 A1* | 4/2015 | Ling | H04L 5/0098 375/371 |
| 2018/0006700 A1* | 1/2018 | Frenne | H04B 7/0417 |

OTHER PUBLICATIONS

Qian, Dayou et al., Nonlinear Compensation Study for WDM Transmission using Muli-Level Modulation over Transoceanic Distance.
OFC/NFOEC Technical Digest, Copyright 2012 OSA, pp. 3.
Chen, Huizhong et al., Post-FEC Performance Evaluation of Coherent QPSK System with an Enhanced Pilot-Aided CPE Scheme.
2105 14th International Conference on Optical Communications and Networks (ICOCN) @ Nanjing, China, Copyright 2015 IEEE, pp. 3.

* cited by examiner

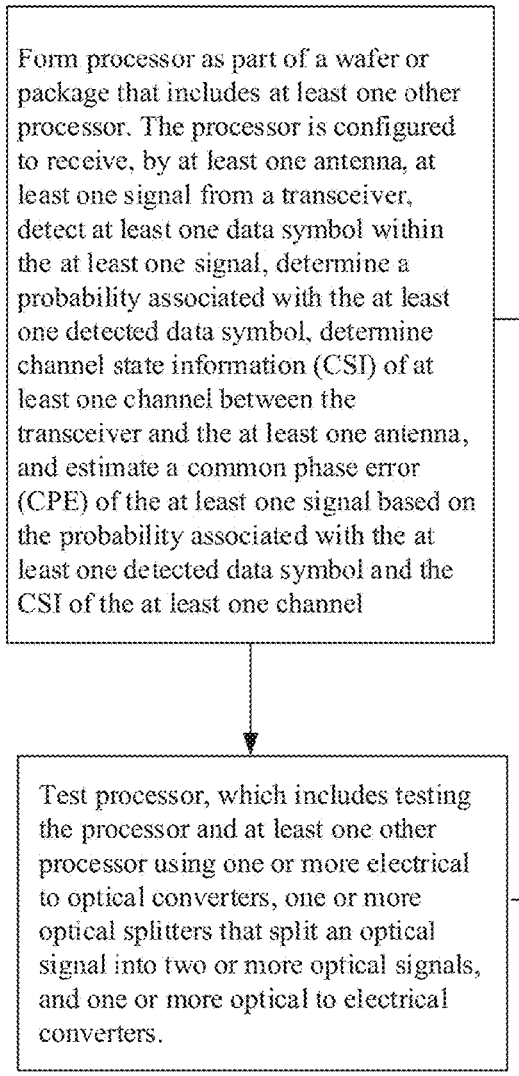
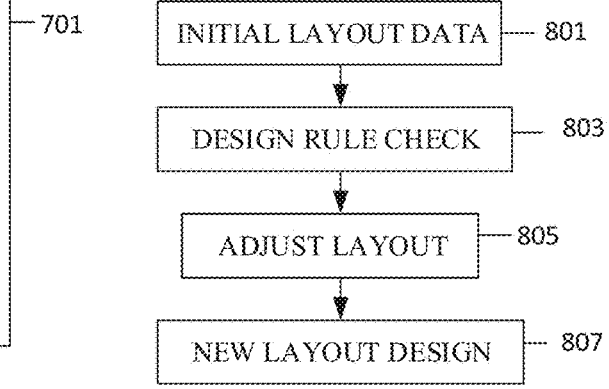
FIG. 8
FIG. 7

METHOD AND APPARATUS FOR DECISION DIRECTED COMMON PHASE ERROR ESTIMATION BASED ON SOFT INFORMATION

PRIORITY

This application claims priority under 35 U.S.C. § 119(e) to U.S. Provisional Patent Application No. 62/442,047 which was filed in the U.S. Patent and Trademark Office on Jan. 4, 2017, the entire content of which is incorporated herein by reference.

FIELD

The present disclosure generally relates to wireless communication systems, and more particularly, to a method and apparatus for decision directed common phase error (CPE) estimation.

BACKGROUND

In a wireless communication system, CPE is usually caused by phase noise and uncompensated frequency offset. CPE causes constellation rotation, which may severely degrade the performance of an orthogonal frequency division multiplexing (OFDM) system, especially an OFDM system with high modulation order and high carrier frequency. Pilot signal based CPE estimation is often used to compensate for such constellation rotation. Due to lack of a sufficient number of pilot signals, decision directed common phase error estimation (DD-CPE) has been proposed to further improve the CPE estimation quality. A typical approach to DD-CPE uses the hard decision of the detected transmit signal as known pilot signals to improve CPE estimation quality.

SUMMARY

According to an aspect of the present disclosure, a method is provided which includes receiving, by at least one antenna of a receiver, at least one signal from a transceiver, detecting at least one data symbol within the at least one signal, determining a probability associated with the at least one detected data symbol, determining channel state information (CSI) of at least one channel between the transceiver and the at least one antenna of the receiver, and estimating a common phase error (CPE) of the at least one signal based on the probability associated with the at least one detected data symbol and the CSI of the at least one channel. A soft decision based DD-CPE is provided in the present disclosure.

According to another aspect of the present disclosure, an apparatus is provided which includes a memory, a processor, at least one antenna, and a receiver configured to receive, by the at least one antenna, at least one signal from a transceiver, detect at least one data symbol within the at least one signal, determine a probability associated with the at least one detected data symbol, determine channel state information (CSI) of at least one channel between the transceiver and the at least one antenna, and estimate a common phase error (CPE) of the at least one signal based on the probability associated with the at least one detected data symbol and the CSI of the at least one channel.

According to another aspect of the present disclosure, a method of manufacturing a processor is provided which includes forming the processor as part of a wafer or a package that includes at least one other processor, wherein the processor is configured to receive, by at least one antenna, at least one signal from a transceiver, detect at least one data symbol within the at least one signal, determine a probability associated with the at least one detected data symbol, determine channel state information (CSI) of at least one channel between the transceiver and the at least one antenna, and estimate a common phase error (CPE) of the at least one signal based on the probability associated with the at least one detected data symbol and the CSI of the at least one channel.

According to another aspect of the present disclosure, a method of constructing an integrated circuit is provided, which includes generating a mask layout for a set of features for a layer of the integrated circuit, wherein the mask layout includes standard cell library macros for one or more circuit features that include a processor configured to receive, by at least one antenna, at least one signal from a transceiver, detect at least one data symbol within the at least one signal, determine a probability associated with the at least one detected data symbol, determine channel state information (CSI) of at least one channel between the transceiver and the at least one antenna, and estimate a common phase error (CPE) of the at least one signal based on the probability associated with the at least one detected data symbol and the CSI of the at least one channel.

BRIEF DESCRIPTION OF THE DRAWINGS

The above and other aspects, features and advantages of the present disclosure will become more apparent from the following detailed description, when taken in conjunction with the accompanying drawings, in which:

FIG. 7 illustrates a flowchart of a method of testing a processor configured to estimate a DD-CPE of a signal, according to an embodiment of the present disclosure; and FIG. 8 illustrates a flowchart of a method of manufacturing a processor configured to estimate a DD-CPE of a signal, according to an embodiment of the present disclosure.

DETAILED DESCRIPTION

The present disclosure will now be described more fully hereinafter with reference to the accompanying drawings, in which embodiments of the present disclosure are shown. This disclosure may, however, be embodied in many different forms and should not be construed as limited to the embodiments set forth herein. Rather, these embodiments are provided so that this disclosure will be thorough and complete, and will fully convey the scope of the device and method to those skilled in the art. Like reference numbers refer to like elements throughout.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, the term "and/or" includes, but is not limited to, any and all combinations of one or more of the associated listed items.

It will be understood that, although the terms first, second, and other terms may be used herein to describe various elements, these elements should not be limited by these terms. These terms are only used to distinguish one element from another. For example, a first signal may be referred to as a second signal, and, similarly a second signal may be referred to as a first signal without departing from the teachings of the disclosure.

The terminology used herein is for the purpose of describing particular embodiments only and is not intended to limit the present device and method. As used herein, the singular forms "a", "an" and "the" are intended to include the plural forms as well, unless the context clearly indicates otherwise. It will be further understood that the terms "comprises" and/or "comprising," or "includes, but is not limited to" and/or "including, but not limited to" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including, but not limited to technical and scientific terms) used herein have the same meanings as commonly understood by one of ordinary skill in the art to which the present device and method belongs. It will be further understood that terms, such as those defined in commonly used dictionaries, should be interpreted as having meanings that are consistent with their meaning in the context of the relevant art and/or the present description, and will not be interpreted in an idealized or overly formal sense unless expressly so defined herein.

Figure 1:
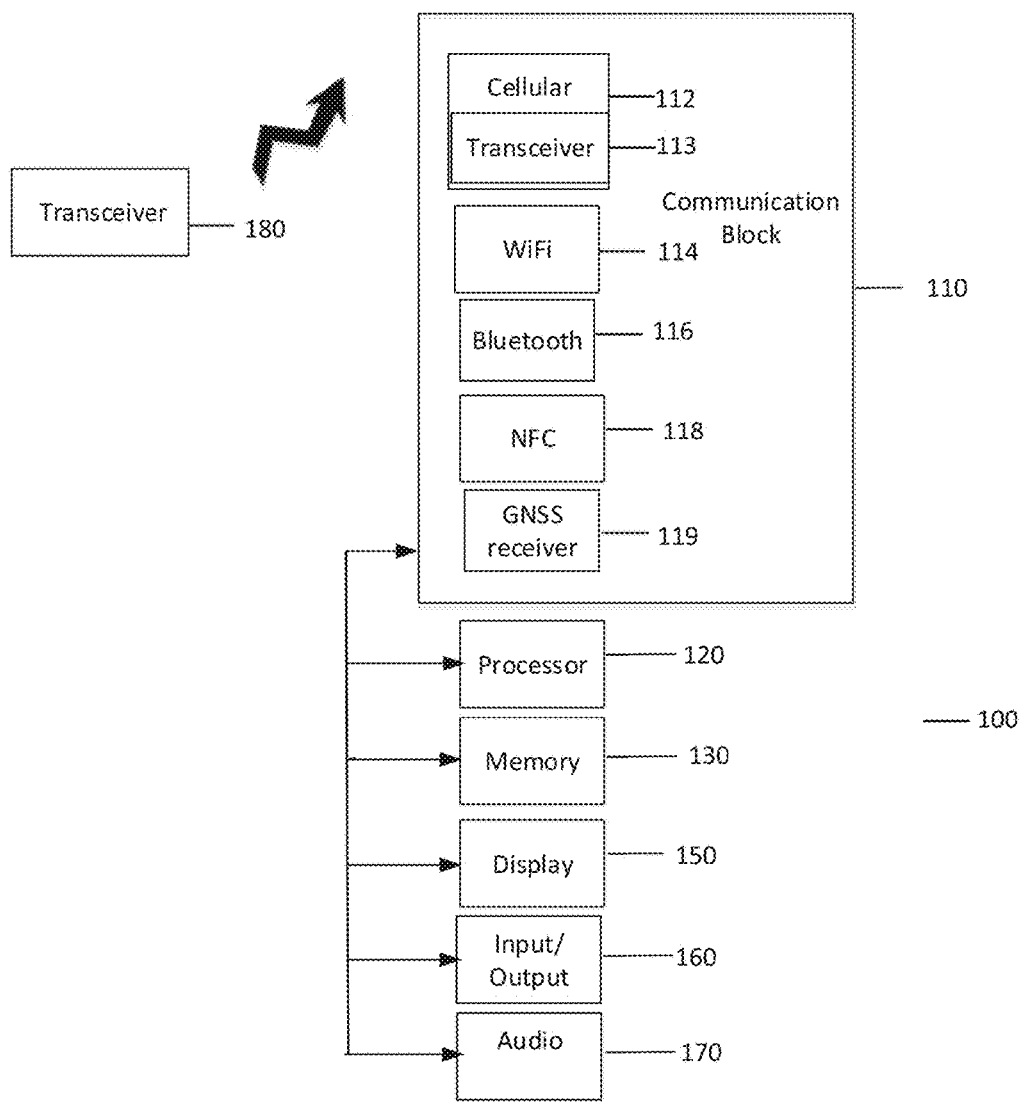
FIG. 1 illustrates a block diagram of an electronic device in a communication network, according to an embodiment of the present disclosure.

FIG. 1 illustrates a block diagram of an electronic device in a communication network, according to an embodiment of the present disclosure.

Referring to FIG. 1, an electronic device 100 includes, but is not limited to, a communication block 110, a processor 120, a memory 130, a display 150, an input/output block 160, an audio block 170 and a wireless transceiver 180. The wireless transceiver 180 may be included in a WiFi access point or cellular base station and includes, but is not limited to, a wireless transmitter and receiver.

The electronic device 100 includes a communication block 110 for connecting the device 100 to another electronic device or a network for communication of voice and data. The communication block 110 provides general packet radio service (GPRS), enhanced data rates for GSM evolution (EDGE), cellular, wide area, local area, personal area, near field, device to device (D2D), machine to machine (M2M), satellite, enhanced mobile broad band (eMBB), massive machine type communication (mMTC), ultra-reliable low latency communication (URLLC), narrowband Internet of things (NB-IoT) and short range communications. The functions of the communication block 110, or a portion thereof including a transceiver 113, may be implemented by a chipset. In particular, the cellular communications block 112 provides a wide area network connection through terrestrial base transceiver stations or directly to other electronic devices, using technologies such second generation (2G), GPRS, EDGE, D2D, M2M, long term evolution (LTE), fifth generation (5G), long term evolution advanced (LTE-A), code division multiple access (CDMA), wideband code division multiple access (WCDMA), universal mobile telecommunications system (UMTS), wireless broadband (WiBro), and global system for mobile communication (GSM). The cellular communications block 112 includes, but is not limited to, a chipset and the transceiver 113. The transceiver 113 includes, but is not limited to, a transmitter and a receiver. The wireless fidelity (WiFi) communications block 114 provides a local area network connection through network access points using technologies such as IEEE 802.11. The Bluetooth communications block 116 provides personal area direct and networked communications using technologies such as IEEE 802.15. The near field communications (NFC) block 118 provides point to point short range communications using standards such as ISO/IEC 14443. The communication block 110 also includes a GNSS receiver 119. The GNSS receiver 119 supports receiving signals from a satellite transmitter.

The electronic device 100 may receive electrical power for operating the functional blocks from a power supply, including, but not limited to, a battery. The wireless transceiver 180 may be a part of a WiFi access point or a terrestrial base transceiver station (BTS) (such as a cellular base station) and includes a radio frequency transmitter and receiver conforming to third generation partnership project (3GPP) standards. The wireless transceiver 180 may provide data and voice communications services to users of mobile user equipment (UE). In the present disclosure, the term "UE" may be used interchangeably with the term "electronic device".

The processor 120 provides application layer processing functions required by the user of the electronic device 100. The processor 120 also provides command and control functionality for the various blocks in the electronic device 100. The processor 120 provides for updating control functions required by the functional blocks. The processor 120 may provide for coordination of resources required by the transceiver 113 including, but not limited to, communication control between the functional blocks. The processor 120 may also update the firmware, databases, lookup tables, calibration method programs and libraries associated with the cellular communications block 112 or WiFi block 114. The WiFi block 114 may also have a local processor or a chipset which dedicates computing resources to WiFi block 114 and other functional blocks such as CPE estimation blocks.

The memory 130 provides storage for device control program code, user data storage, application code and data storage. The memory 130 may provide data storage for the firmware, libraries, databases, lookup tables, algorithms, methods, channel estimation parameters, and calibration data required by the cellular communications block 112 or WiFi block 114. The program code and databases required by the cellular communications block 112 or WiFi block 114 may be loaded into local storage from the memory 130 upon device boot up. The cellular communications block 112 or WiFi block 114 may also have local, volatile and non-volatile memory for storing the program code, libraries, databases, calibration data and lookup table data.

The display 150 may be a touch panel, and may be embodied as a liquid crystal display (LCD), organic light emitting diode (OLED) display, active matrix OLED (AMOLED) display, and the like. The input/output block 160 controls the interface to the user of the electronic device 100. The audio block 170 provides for audio input and output to/from the electronic device 100.

The wireless transceiver 180 may be included in an access point or base station that is used to receive, transmit or relay wireless signals. The wireless transceiver 180 may facilitate communication with the electronic device 100 by sending, receiving, and relaying data communication signals to and from the electronic device 100. The electronic device 100 may be connected to a network through the wireless transceiver 180. For example, the wireless transceiver 180 may be an access point, a cell tower, a wireless router, an antenna, multiple antennas, or a combination thereof being used to send signals to, or receive signals from, the electronic device 100, such as a smartphone. The wireless transceiver 180 may relay the wireless signals through the network to enable communication with other electronic devices 100 such as user equipment (UE), servers or a combination thereof. The wireless transceiver 180 may be used to transmit the communication signals, such as voice or data.

The present disclosure is related to a wireless communication system. In particular, the present disclosure is related to decision directed common phase error estimation (DD-CPE) using soft information and post minimum mean square error (MMSE) processing.

According to an embodiment of the present disclosure, the present system and method improves CPE estimation quality in an OFDM wireless communication system. DD-CPE improves CPE estimation performance when used in addition to pilot signal based CPE estimation. In a typical DD-CPE system, a hard decision of a received data symbol is used as feedback information to improve the CPE estimation. The present DD-CPE system and method use soft information based on a log likelihood ratio (LLR) from a symbol detector to provide more accurate CPE estimation.

According to an embodiment of the present disclosure, the present soft decision based DD-CPE method utilizes the a priori distribution of the received data symbols obtained using the LLR from a symbol detector. Based on the soft information from the symbol detector, a maximum likelihood (ML) estimation problem can be formulated. The present system and method provide expectation-maximization (EM) like approximate solution to the ML estimation problem. The soft decision based DD-CPE method provides improvement over a hard decision based DD-CPE method. The present system and method further include post MMSE scaling to improve the DD-CPE in a low signal-to-noise ratio (SNR) environment.

A frequency domain signal received on subcarrier k in an OFDM system may be written as shown in Equation (1):

$$y_k = \hat{h}_k e^{j\theta} x_k + w_k \quad (1)$$

where $\hat{h}_k$ is the channel component without CPE and $x_k$ is the transmitted signal, $\theta$ is the CPE to be estimated, and $w_k$ is additive white Gaussian noise (AWGN).

The probability that constellation point $s_i$ is transmitted may be calculated by a symbol detector. Since the symbol detector has no prior knowledge of $\theta$ initially, the probability of receiving $y_k$ when constellation point $s_i$ is transmitted may be approximated as shown in Equation (2):

$$p(y_k \mid \theta = 0, x_k = s_i) = \frac{1}{\sqrt{2\pi\sigma^2}} \left[ -\frac{1}{2\sigma^2}(y_k - \hat{h}_k s_i)^2 \right] \quad (2)$$

where $\sigma^2$ is the noise variance and the initial assumption is $\theta = 0$.

The conditional distribution of $x_k = s_i$ may be derived as shown in Equation (3):

$$p(x_k = s_i \mid \theta = 0, y_k) = \frac{p(x_k = s_i, y_k \mid \theta = 0)}{p(y_k \mid \theta = 0)} \quad (3)$$

$$= \frac{\frac{1}{M\sqrt{2\pi\sigma^2}}\left[-\frac{1}{2\sigma^2}(y_k - \hat{h}_k s_i)^2\right]}{\sum_i \frac{1}{M\sqrt{2\pi\sigma^2}}\left[-\frac{1}{2\sigma^2}(y_k - \hat{h}_k s_i)^2\right]}$$

$$= \frac{p(x_k = s_i \mid \theta = 0, y_k)}{\sum_{j=0}^{M-1} p(x_k = s_j \mid \theta = 0, y_k)}$$

The a priori distribution of $x_k$ may be approximated as $p_{k,i} = p(x_k = s_i \mid \theta = 0, y_k)$, and therefore, the distribution of $y_k$, for a given $\theta$, may be derived as shown in Equation (4):

$$p(y_k; \theta) = \sum_{i=0}^{M-1} p(y_k; \theta \mid x_k = s_i) p_{k,i} = \quad (4)$$

$$\sum_{i=0}^{M-1} \frac{1}{\sqrt{2\pi\sigma^2}} \exp\left[-\frac{1}{2\sigma}(y_k - \hat{h}_k e^{j\theta} s_i)^2\right] p_{k,i}.$$

where M is the total number of constellation points in the transmitted signal.

Since the received signal $y_i$ on N subcarriers of the transmitted signal is independent for a given $\theta$, the distribution of $y_0, \ldots y_{N-1}$ for a given $\theta$ may be written as shown in Equation (5):

$$p(y_0, \ldots, y_{N-1}; \theta) = \prod_{k=0}^{N-1} p(y_k; \theta) \quad (5)$$

In Equation (5), $\theta$ may be treated as an unknown constant to be estimated. The ML estimation of $\theta$ may be derived as shown in Equation (6):

$$\hat{\theta} = \arg\max_\theta p(y_0, \ldots, y_{N-1}; \theta) \quad (6)$$

It can be shown that $\log(p(y_0, \ldots, y_{N-1}, \theta))$ is a concave function of $\theta$. Therefore, it is equivalent to solving Equation (7):

$$\frac{\partial \log(p(y_0, \ldots, y_{N-1}; \theta))}{\partial \theta} = 0. \quad (7)$$

Since $$\frac{\partial \log(p(y_0, \ldots, y_{N-1}; \theta))}{\partial \theta} = \sum_k \frac{\partial \log(p(y_k; \theta))}{\partial \theta},$$

Equation (8) may be derived as follows:

$$\frac{\partial \log(p(y_k; \theta))}{\partial \theta} = \frac{j \sum_i p(y_k; \theta \mid x_k = s_i) p_{k,i} (y_k \hat{h}_k^* e^{-j\theta} s_i^* - y_k^* \hat{h}_k^* e^{j\theta} s_i^*)}{2\sigma \cdot p(y_k; \theta)} \quad (8)$$

Since $$\frac{p(y_k; \theta \mid x_k = s_i) p_{k,i}}{p(y_k; \theta)} = Pr\{x_k = s_i, \theta \mid y_k\},$$

the conditional expected value of $x_k$ is shown in Equation (9):

$$E[x_k] = \sum_{i=1}^{M-1} Pr\{x_k = s_i, \theta \mid y_k\} s_i \quad (9)$$

However, the expected value, $E[x_k]$, in Equation (9) is a function of $\theta$, which makes Equation (7) difficult to solve with limited computing resources. Therefore, in order to reduce computational complexity, $E[x_k]$ may be approximated as the soft mean from the symbol detector as shown in Equation (10):

$$E[x_k] \approx \sum_{i=0}^{M-1} Pr\{x_k = s_i, \theta \mid y_k\} s_i \quad (10)$$
$$= \sum_{i=0}^{M-1} p_{k,i} s_i$$

Using the approximation in Equation (10), the solution to Equation (7) may be obtained as shown in Equation (11):

$$\hat{\theta} = \arg\left(\sum_k y_k \hat{h}_k^* E[\hat{x}_k^*]\right) \quad (11)$$

According to an embodiment of the present disclosure, the DD-CPE system and method may be generalized to a multiple-input multiple output (MIMO) system having multiple spatial streams received by multiple antennas. Each of the spatial streams may be a unique spatial stream in that it may carry signals which are unique from the other spatial streams. By adding a stream index i, the received signal may be represented as shown in Equation (12):

$$y_{i,k} = h_{i,k} e^{j\theta} x_{i,k} + w_{i,k} \quad (12)$$

where each spatial stream may be assumed to have the same CPE.

The ML based estimation may then be represented as shown in Equation (13):

$$\hat{\theta} = \arg(\Sigma_i \Sigma_k y_{i,k} h_{i,k}^* E[\hat{x}_{i,k}]^*) \quad (13)$$

The resulting soft DD-CPE may be determined using the soft mean value calculated in a symbol detector. The resulting soft information based DD-CPE has a similar structure as a pilot signal based CPE estimation; however, mean values of detected symbols are used instead of known pilot signal symbols.

According to an embodiment of the present disclosure, the present DD-CPE system and method may be combined with pilot signal based CPE estimation using Equation (14):

$$\hat{\theta} = \arg(\Sigma_{k \in K_d} y_k \hat{h}_k^* E[\hat{x}_k^*] + \Sigma_{j \in K_p} y_j \hat{h}_j^* p_j^*) \quad (14)$$

where $K_d$ and $K_p$ are the index sets for data subcarriers and pilot signal subcarriers, respectively, $p_j$ is the pilot signal symbol transmitted on pilot signal subcarrier j, and $\hat{\theta}_p = \arg(\Sigma_{j \in K_p} y_j h_j^* p_j^*)$ is the pilot signal symbol based CPE estimation.

To further improve CPE estimation performance, the present DD-CPE system and method may further iteratively update the soft symbol mean $E[\hat{x}_k]$ and the CPE estimation $\hat{\theta}$.

The iterative method may be implemented using both data and pilot signal subcarriers. The method iteratively updates the soft symbol mean and CPE one at a time, while fixing the other. The iterative method uses $\hat{\theta}_n = \arg(\Sigma_k y_k h_k^* s_k^*)$ for the soft DD-CPE as shown in Equation (14) above.

Figure 2:
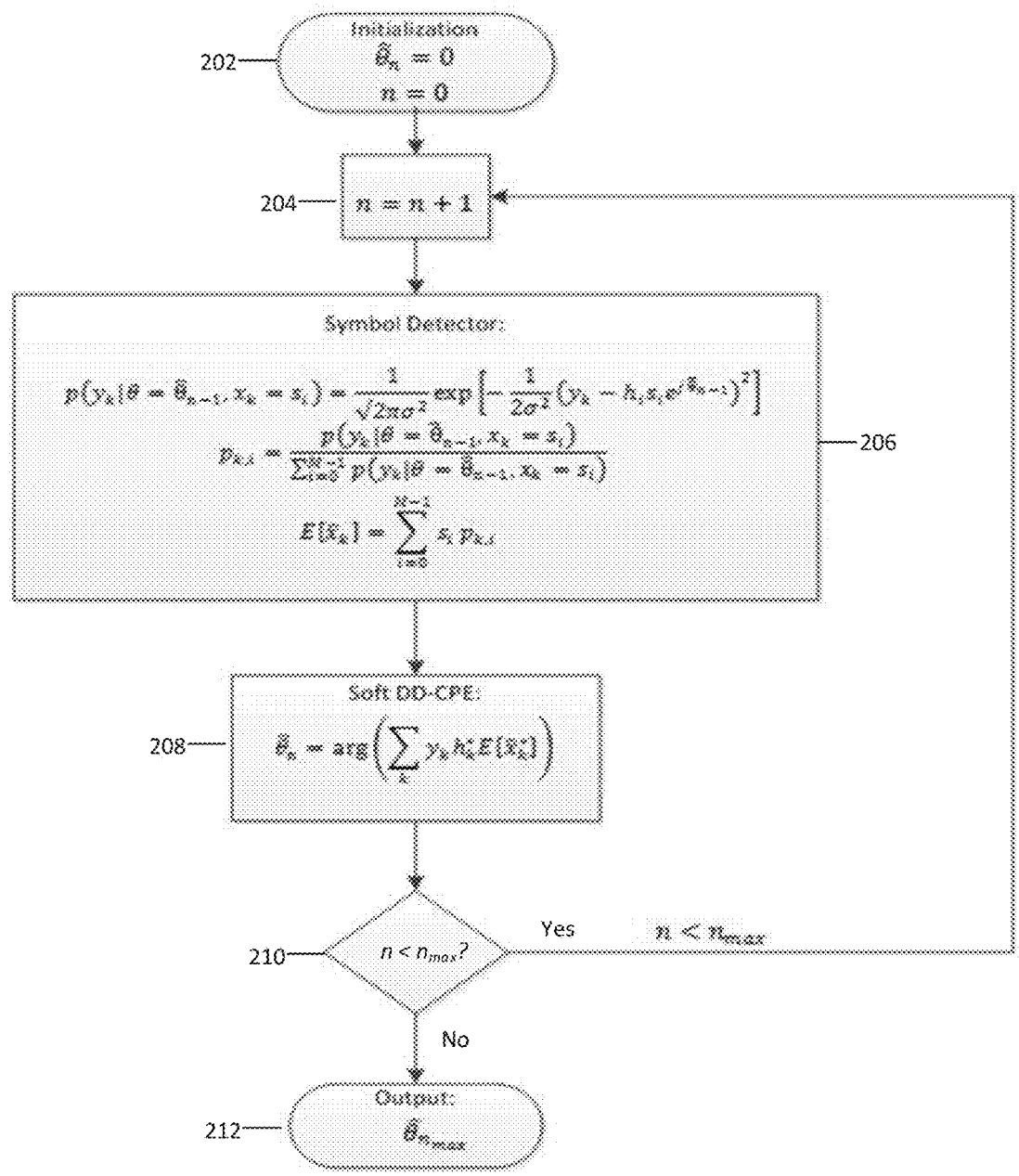
FIG. 2 illustrates an exemplary flowchart for iterative soft DD-CPE, according to an embodiment of the present disclosure.

FIG. 2 illustrates an exemplary flowchart for iterative soft DD-CPE, according to an embodiment of the present disclosure.

Referring to FIG. 2, at 202, the present iterative soft DD-CPE system and method initializes CPE estimation $\hat{\theta}_0 = 0$ and a counter n=0. At 204, the counter n is incremented by one. At 206, the symbol detector estimates a soft symbol mean assuming $\theta = \hat{\theta}_n$, i.e., outputs $E[\hat{x}_k]$ for each subcarrier k using Equations (2) and (10) above with $\theta = \hat{\theta}_n$ instead of $\theta = 0$. At 208, the soft DD-CPE in the ith iteration is determined using Equation (11) above. At 210, the present system determines whether n has reached a specified maximum number of iterations $n_{max}$. If n has reached $n_{max}$, the present system determines the output $\hat{\theta}_{n_{max}}$ at 212. If n has not reached $n_{max}$, the present system returns to increment n by one at 204.

Figure 3:
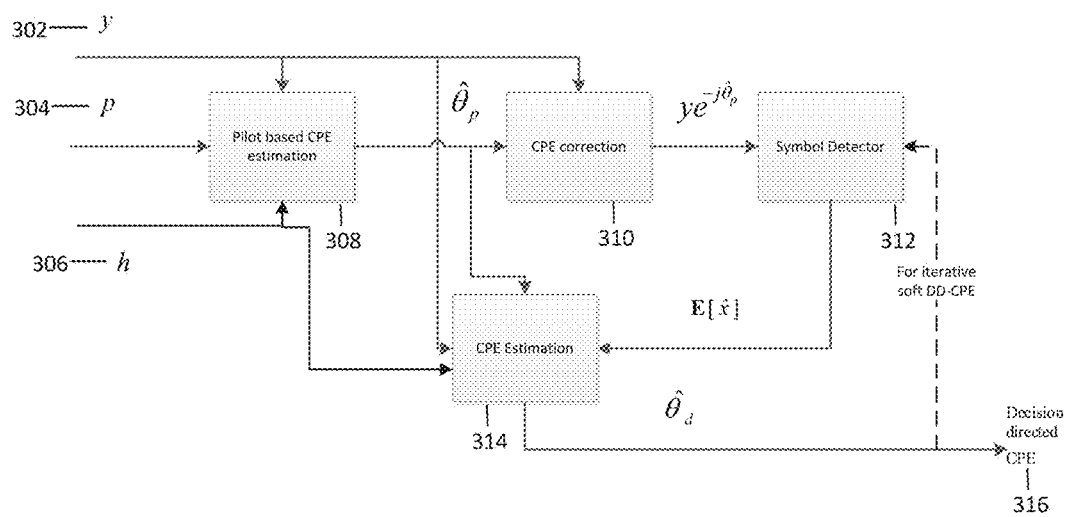
FIG. 3 illustrates an exemplary block diagram of a circuit for iterative soft DD-CPE, according to an embodiment of the present disclosure.

FIG. 3 illustrates an exemplary block diagram of a circuit for iterative soft DD-CPE, according to an embodiment of the present disclosure.

Referring to FIG. 3, the circuit for DD-CPE using soft information includes a pilot signal based CPE estimation block 308, a CPE correction block 310, a symbol detector 312 and a CPE estimation block 314. In FIG. 3, a frequency domain signal y 302, a known pilot signal p 304 and channel estimation information h 306 are inputs to the pilot signal based CPE estimation block 308. The output of the pilot signal based CPE estimation block 308 is the pilot signal estimated CPE, $\hat{\theta}_p$. The CPE correction block 310 receives as inputs, the pilot signal estimated CPE $\hat{\theta}_p$ and the frequency domain signal y 302, and outputs a CPE corrected frequency domain signal. The symbol detector 312 receives the DD-CPE $\hat{\theta}_p$ and the CPE corrected frequency domain signal as inputs. The symbol detector 312 outputs the conditional expected value of the transmitted signal $E[\hat{x}]$. The CPE estimation block 314 receives as inputs, the frequency domain signal y 302, the channel estimation information h 306, the pilot signal estimated CPE $\hat{\theta}_p$, and the conditional expected value of the transmitted signal $E[\hat{x}]$ which is output from the symbol detector 312. The CPE estimation block 314 outputs the DD-CPE $\hat{\theta}_d$ 316.

According to an embodiment of the present disclosure, the present DD-CPE system and method improves the approximate ML estimation in a low SNR environment due to a large angular domain noise based on MMSE estimation.

When a small common phase rotation is assumed, the received signal may be written as shown in Equation (15):

$$y_k = \hat{h}_k e^{j\theta} x_k + w_k \approx \hat{h}_k x_k (1+j\theta) + w_k \quad (15)$$

The above DD-CPE in Equation (14) may be written as shown in Equation (16):

$$\hat{\theta} = \arg(\Sigma_k{}^N y_k \hat{h}_k^* s_k^*) \quad (16)$$

where $s_k = p_k$ on pilot signal subcarriers and $s_k = E[\hat{x}_k]$ on data subcarriers.

To derive an MMSE scaling factor for $\hat{\theta}$, it is assumed that $\theta$ is a zero mean Gaussian random variable and the relationship of Equation (17) is also assumed:

$$\hat{\theta} \approx -j\left(\frac{\sum_k y_k \hat{h}_k^* s_k^*}{\sum_k |\hat{h}_k s_k|^2} - 1\right)$$

$$= \theta - \frac{j}{\sum_k |\hat{h}_k s_k|^2} \sum_k w_k \hat{h}_k^* s_k^* \quad (17)$$

Using the Gaussian assumption for $\theta$, the present system and method may derive the MMSE estimation of $\theta$ using the soft DD-CPE output $\hat{\theta}$. The accumulated phasor (phase vector) may be denoted as $r = \Sigma_k y_k h_k^* s_k^*$. The end result may be written as Equation (18):

$$\hat{\theta}_{MMSE} = \frac{\hat{\theta}}{1 + \frac{\sum_k |h_k s_k|^2 \sigma^2}{\sigma_\theta^2 \left(|r|^2 - \sum_k |h_k s_k|^2 \sigma^2\right)}} \quad (18)$$

where $\sigma_\theta^2$ is the variance of Gaussian random variable $\theta$.

The variance $\sigma_\theta^2$, may either be obtained from offline measurement using the CPE statistics or calculated. Based on the soft DD-CPE output, the variance of $\theta$ may be obtained using Equation (19):

$$\sigma_\theta^2 = \hat{\theta}^2 - \frac{\sum_k |h_k s_k|^2 \sigma^2}{\left(|r|^2 - \sum_k |h_k s_k|^2 \sigma^2\right)} \quad (19)$$

Therefore, the MMSE estimation may be written as shown in Equation (20):

$$\hat{\theta}_{MMSE} = \hat{\theta}\left(1 - \frac{\sum_k |h_k s_k|^2 \sigma_w^2}{\hat{\theta}^2\left(|r|^2 - \sum_k |h_k s_k|^2 \sigma^2\right)}\right) \quad (20)$$

Figure 4:
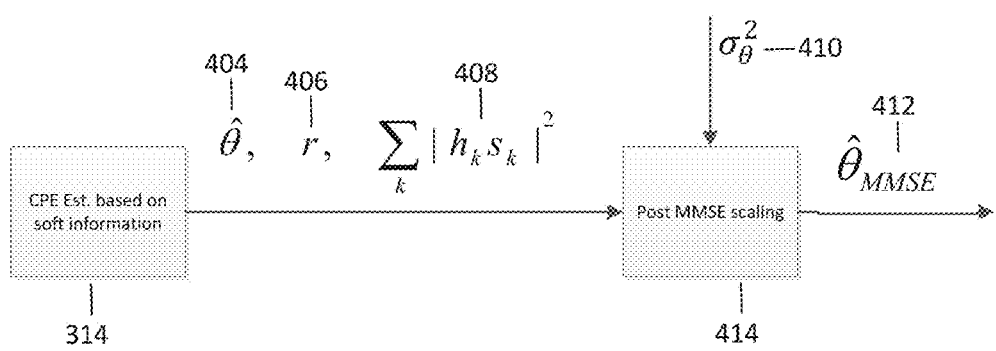
FIG. 4 illustrates an exemplary block diagram of a circuit for combining approximate ML based DD-CPE and post MMSE scaling processing, according to an embodiment of the present disclosure.

FIG. 4 illustrates an exemplary block diagram of a circuit for combining ML based DD-CPE and post MMSE scaling processing, according to an embodiment of the present disclosure.

Referring to FIG. 4, the circuit for combining ML based DD-CPE and post MMSE scaling processing includes a CPE estimator based on soft information block 314 and a post MMSE scaling block 414. The CPE estimator based on soft information block 314 produces outputs CPE $\hat{\theta}$ 404, phase vector r 406, and $\Sigma_k |h_k s_k|^2$ 408, which are inputs to the post MMSE scaling block 414. The variance $\sigma_\theta^2$ 410 of $\theta$ is also an input to the post MMSE scaling block 414, which determines and outputs the scaled CPE $\hat{\theta}_{MMSE}$ 412.

Figure 5:
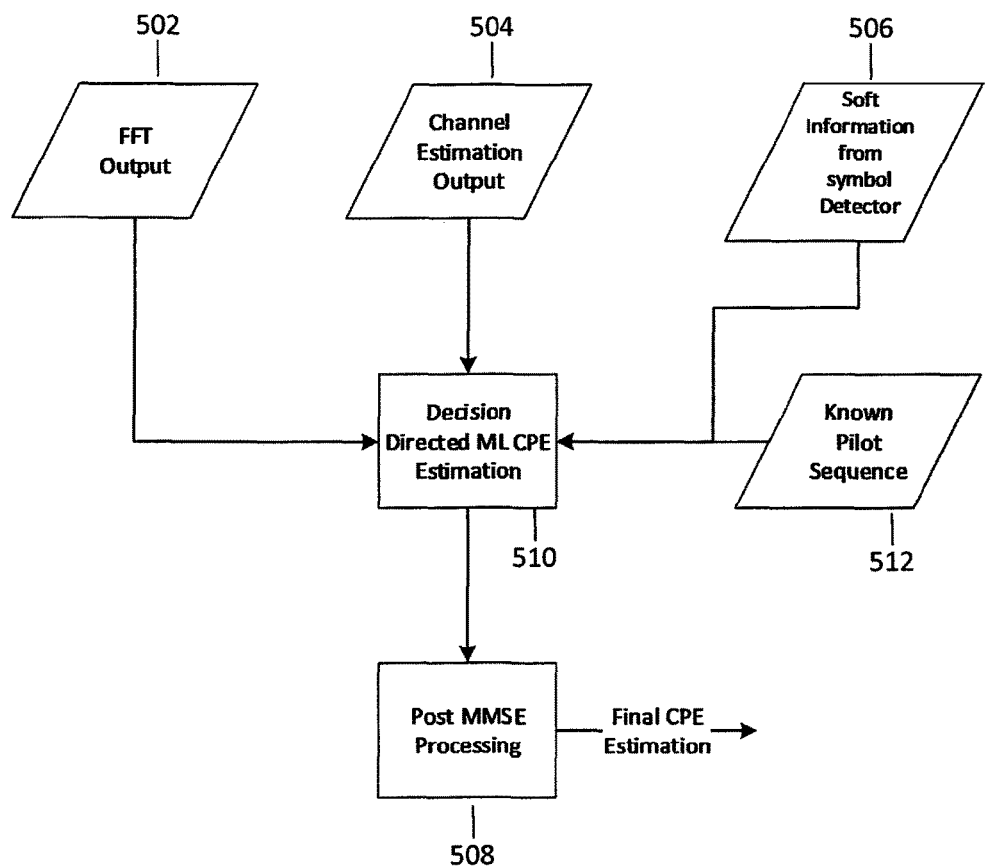
FIG. 5 illustrates a block diagram of a circuit for soft information DD-CPE with post MMSE processing, according to an embodiment of the present disclosure.

FIG. 5 illustrates a block diagram of a circuit for soft information DD-CPE with post MMSE processing, according to an embodiment of the present disclosure.

Referring to FIG. 5, a circuit for soft information based DD-CPE with post MMSE processing includes a fast fourier transform (FFT) output block 502, a channel estimation output block 504, a symbol detector block 506, a decision directed ML CPE estimation block 510, a post MMSE processing block 508 and a known pilot signal sequence block 512. The decision directed ML CPE estimation block 510 receives inputs from the FFT output block 502, the channel estimation output block 504, the symbol detector block 506 in the form of soft information, and the known pilot signal sequence block 512. The output from the decision directed ML CPE estimation block 510 is provided to the post MMSE processing block 508 which produces the final CPE estimation.

Figure 6:
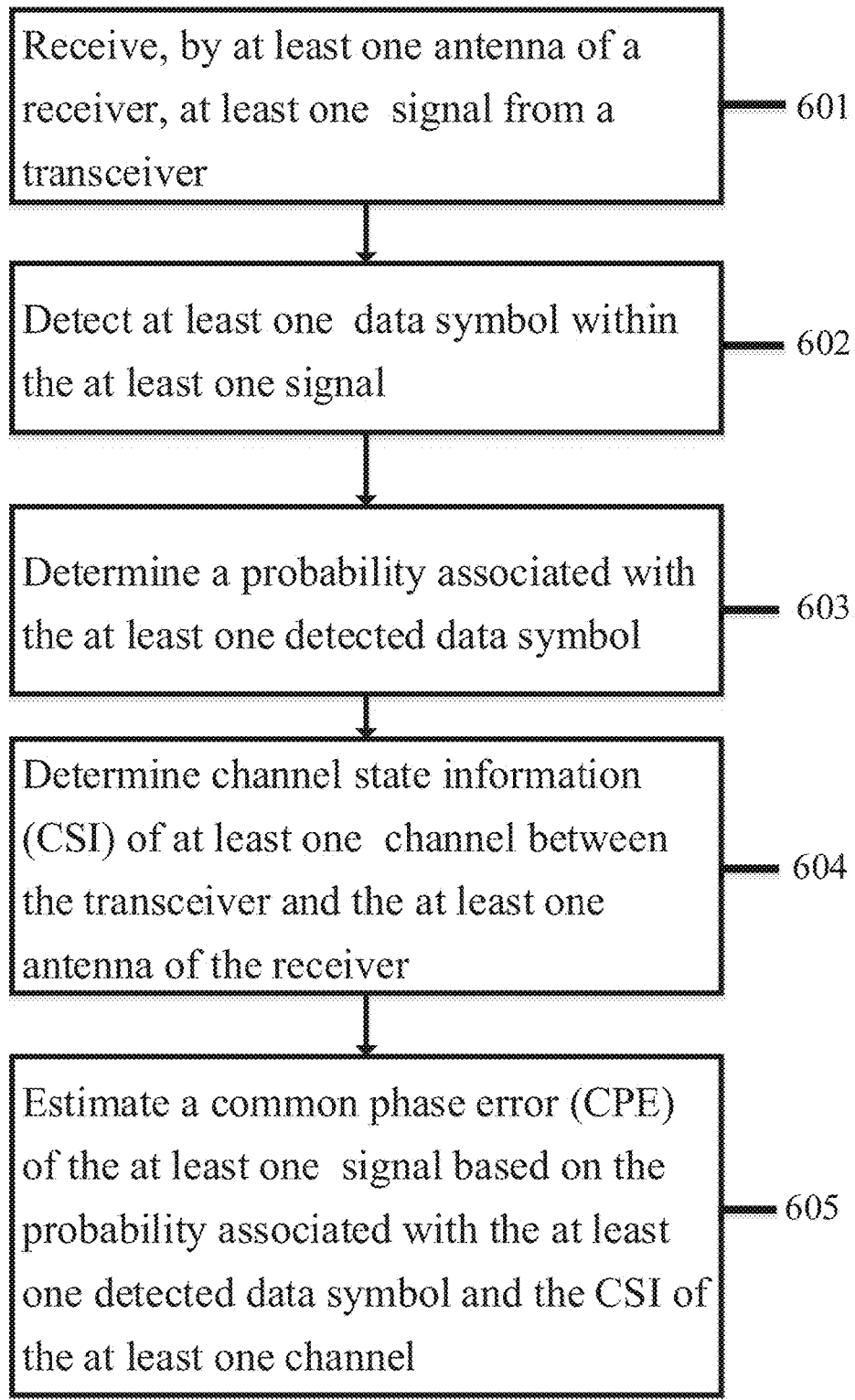
FIG. 6 illustrates a flowchart of a method of estimating a DD-CPE of a signal, according to an embodiment of the present disclosure.

FIG. 6 is a flowchart of a method of estimating a CPE of a signal, according to an embodiment of the present disclosure.

Referring to the flowchart of FIG. 6, the method, at 601, receives, by at least one antenna of a receiver, at least one signal from a transceiver. At 602, the method detects at least one data symbol within the at least one signal. At 603, the method determines a probability associated with the at least one detected data symbol. At 604, the method determines channel state information (CSI) of at least one channel between the transceiver and the at least one antenna. At 605, the method estimates a CPE of the at least one signal based on the probability associated with the at least one detected data symbol and the CSI of the at least one channel.

FIG. 7 is a flowchart of a method of testing a processor configured to estimate a DD-CPE of a signal, according to an embodiment of the present disclosure, where the processor is either implemented in hardware or implemented in hardware that is programmed with software.

Referring to FIG. 7, the method, at 701, forms the processor as part of a wafer or package that includes at least one other processor. The processor is configured to receive, by at least one antenna, at least one signal from a transceiver, detect at least one data symbol within the at least one signal, determine a probability associated with the at least one detected data symbol, determine channel state information (CSI) of at least one channel between the transceiver and the at least one antenna, and estimate a common phase error (CPE) of the at least one signal based on the probability associated with the at least one detected data symbol and the CSI of the at least one channel.

At 703, the method tests the processor, which includes testing the processor and at least one other processor using one or more electrical to optical converters, one or more optical splitters that split an optical signal into two or more optical signals, and one or more optical to electrical converters.

FIG. 8 is a flowchart of a method of manufacturing a processor configured to estimate a DD-CPE of a signal, according to an embodiment of the present disclosure. Referring to FIG. 8, the method, at 801, includes an initial layout of data in which the method generates a mask layout for a set of features for a layer of an integrated circuit. The mask layout includes standard cell library macros for one or more circuit features that include a processor. The processor is configured to receive, by at least one antenna, at least one signal from a transceiver, detect at least one data symbol within the at least one signal, determine a probability associated with the at least one detected data symbol, determine channel state information (CSI) of at least one channel between the transceiver and the at least one antenna, and estimate a common phase error (CPE) of the at least one signal based on the probability associated with the at least one detected data symbol and the CSI of the at least one channel.

At 803, there is a design rule check in which the method disregards relative positions of the macros for compliance to layout design rules during the generation of the mask layout.

At 805, there is an adjustment of the layout in which the method checks the relative positions of the macros for compliance to layout design rules after generating the mask layout.

At 807, a new layout design is made, in which the method, upon detection of noncompliance with the layout design rules by any of the macros, modifies the mask layout by modifying each of the noncompliant macros to comply with the layout design rules, generates a mask according to the modified mask layout with the set of features for the layer of the integrated circuit and manufactures the integrated circuit layer according to the mask.

While the present disclosure has been particularly shown and described with reference to certain embodiments thereof, it will be understood by those of ordinary skill in the art that various changes in form and details may be made therein without departing from the spirit and scope of the present disclosure as defined by the appended claims and their equivalents.

What is claimed is:

1. A method, comprising:
   receiving, by at least one antenna of a receiver, at least one signal from a transceiver;
   detecting at least one data symbol within the at least one signal;
   determining a probability associated with the at least one detected data symbol;
   determining channel state information (CSI) of at least one channel between the transceiver and the at least one antenna of the receiver;
   estimating a common phase error (CPE) of the at least one signal based on the probability associated with the at least one detected data symbol and the CSI of the at least one channel;
   determining multiple probabilities associated with the at least one detected data symbol;
   determining a soft mean of the determined multiple probabilities; and
   estimating the CPE of the at least one signal based on the soft mean of the determined multiple probabilities associated with the at least one detected data symbol.

2. The method of claim 1, further comprising estimating a CPE of a pilot signal received from the transceiver.

3. The method of claim 2, further comprising estimating the CPE of the at least one signal based on the probability associated with the at least one detected data symbol, the estimated CPE of the pilot signal, and the CSI of the at least one channel.

4. The method of claim 1, further comprising scaling the estimated CPE based on a minimum mean square error (MMSE) processing of the estimated CPE.

5. The method of claim 1, further comprising:
   iteratively updating the soft mean using the determined multiple probabilities; and
   iteratively updating the estimated CPE.

6. The method of claim 5, wherein iteratively updating the soft mean and the estimated CPE comprises:
   fixing a value of the soft mean while updating a value of the estimated CPE; and fixing the value of the estimated CPE while updating the value of the soft mean.

7. The method of claim 3, further comprising:
   determining multiple probabilities associated with the at least one detected data symbol;
   determining a soft mean of the determined multiple probabilities; and
   estimating the CPE of the at least one signal based on the soft mean of the determined multiple probabilities associated with the at least one detected data symbol.

8. The method of claim 7, further comprising:
   iteratively updating the soft mean using the determined multiple probabilities; and
   iteratively updating the estimated CPE.

9. The method of claim 8, wherein iteratively updating the soft mean and the estimated CPE comprises:
   fixing a value of the soft mean while updating a value of the estimated CPE; and fixing the value of the estimated CPE while updating the value of the soft mean.

10. An apparatus, comprising:
    a memory;
    a processor;
    at least one antenna; and
    a receiver configured to:
    receive, by the at least one antenna, at least one signal from a transceiver,
    detect at least one data symbol within the at least one signal,
    determine a probability associated with the at least one detected data symbol,
    determine channel state information (CSI) of at least one channel between the transceiver and the at least one antenna,
    estimate a common phase error (CPE) of the at least one signal based on the probability associated with the at least one detected data symbol and the CSI of the at least one channel,
    determine multiple probabilities associated with the at least one detected data symbol,
    determine a soft mean of the determined multiple probabilities, and
    estimate the CPE of the at least one signal based on the soft mean of the determined multiple probabilities associated with the at least one detected data symbol.

11. The apparatus of claim 10, wherein the receiver is further configured to estimate a CPE of a pilot signal received from the transceiver.

12. The apparatus of claim 11, wherein the receiver is further configured to estimate the CPE of the signal based on the probability associated with the at least one detected data symbol, the estimated CPE of the pilot signal, and the CSI of the at least one channel.

13. The apparatus of claim 10, wherein the receiver is further configured to scale the estimated CPE based on a minimum mean square error (MMSE) processing of the estimated CPE.

14. The apparatus of claim 10, wherein the receiver is further configured to: iteratively update the soft mean using the determined multiple probabilities, and
    iteratively update the estimated CPE.

15. The apparatus of claim 14, wherein the receiver is further configured to:

fix a value of the soft mean while updating a value of the estimated CPE, and fix the value of the estimated CPE while updating the value of the soft mean.

16. The apparatus of claim 12, wherein the receiver is further configured to:

determine multiple probabilities associated with the at least one detected data symbol, determine a soft mean of the determined multiple probabilities, and estimate the CPE of the at least one signal based on the soft mean of the determined multiple probabilities associated with the at least one detected data symbol.

17. The apparatus of claim 16, wherein the receiver is further configured to:

iteratively update the soft mean using the determined multiple probabilities, and iteratively update the estimated CPE.

18. The apparatus of claim 17, wherein the receiver is further configured to:

fix a value of the soft mean while updating a value of the estimated CPE, and fix the value of the estimated CPE while updating the value of the soft mean.

19. A method of manufacturing a processor, comprising:

forming the processor as part of a wafer or package that includes at least one other processor, wherein the processor is configured to receive, by at least one antenna, at least one signal from a transceiver, detect at least one data symbol within the at least one signal, determine a probability associated with the at least one detected data symbol, determine channel state information (CSI) of at least one channel between the transceiver and the at least one antenna, estimate a common phase error (CPE) of the at least one signal based on the probability associated with the at least one detected data symbol and the CSI of the at least one channel, determine multiple probabilities associated with the at least one detected data symbol, determine a soft mean of the determined multiple probabilities, and estimate the CPE of the at least one signal based on the soft mean of the determined multiple probabilities associated with the at least one detected data symbol and testing the processor, which includes testing the processor and at least one other processor using one or more electrical to optical converters, one or more optical splitters that split an optical signal into two or more optical signals, and one or more optical to electrical converters.

20. A method of constructing an integrated circuit, comprising:

generating a mask layout for a set of features for a layer of the integrated circuit, wherein the mask layout includes standard cell library macros for one or more circuit features that include a processor configured to receive, by at least one antenna, at least one signal from a transceiver, detect at least one data symbol within the at least one signal, determine a probability associated with the at least one detected data symbol, determine channel state information (CSI) of at least one channel between the transceiver and the at least one antenna, and estimate a common phase error (CPE) of the at least one signal based on the probability associated with the at least one detected data symbol and the CSI of the at least one channel, and disregarding relative positions of the macros for compliance to layout design rules during the generation of the mask layout;

checking the relative positions of the macros for compliance to layout design rules after generating the mask layout;

upon detection of noncompliance with the layout design rules by any of the macros, modifying the mask layout by modifying each of the noncompliant macros to comply with the layout design rules;

generating a mask according to the modified mask layout with the set of features for the layer of the integrated circuit; and manufacturing the integrated circuit layer according to the mask.

* * * * *